Patented Sept. 5, 1950

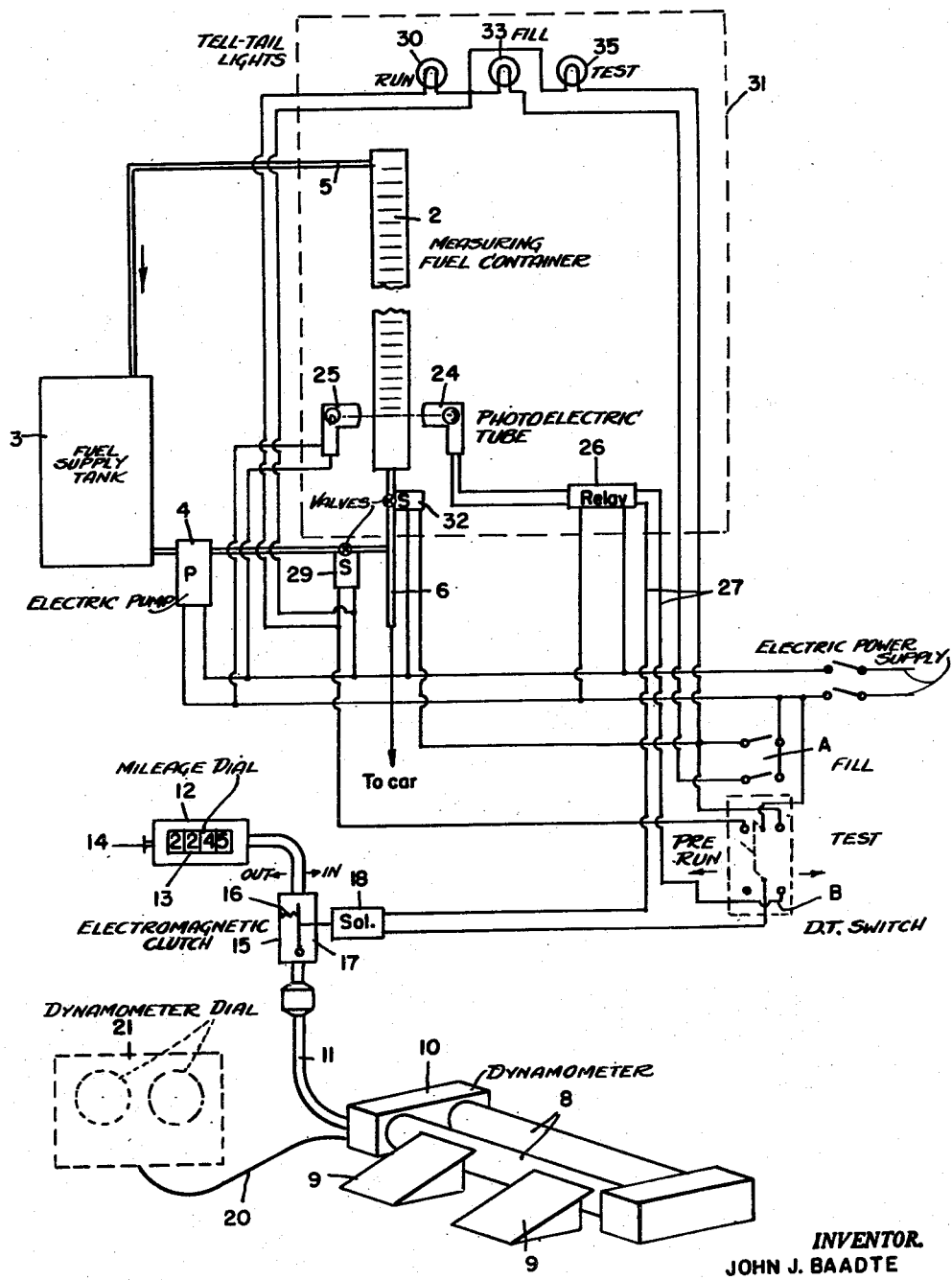

2,521,322

UNITED STATES PATENT OFFICE 2,521,322

MEANS FOR TESTING FUEL PERFORMANCE

John J. Baadte, Youngstown, Ohio, assignor to The Standard Oil Company, Cleveland, Ohio, a corporation of Ohio Application December 8, 1945, Serial No. 633,838

6 Claims. (Cl. 73—114)

It has been customary to run tests on gasolines in special laboratory testing engines or by road runs in selected automobiles. The results of tests in laboratory test engines have a disadvantage of not being directly correlatable to road requirements and conditions; and road runs give accurate information only for the particular car and condition of road encountered. Both of the aforesaid tests, moreover, require considerable time and a rather considerable quantity of fuel. In accordance with the present invention, in contrast, the performance of a liquid motor fuel in a road vehicle may be checked very quickly, and with conditions so standardized as to give precise information, and moreover only a small amount of fuel and time are required. Other objects and advantages of the invention will be apparent from the following description.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

In said annexed drawing, the sole figure is a schematic showing of apparatus involved in the invention.

In accordance with the invention, there is provided a container 2 for a predetermined quantity of the liquid fuel to be tested, and in particular this includes a precision control actuated by the liquid as in its descent in the container it comes to the predetermined amount or level, and particularly the meniscus of the top of the liquid column at this point actuates electric means precisely terminating the test. While the container otherwise may vary somewhat, for precision I prefer a long container with small diameter. Thus, for example, a burette-like glass tube with a length of four feet and diameter 16 mm. is an efficient precision measuring container. The container may be supplied from a general supply tank 3 by an electrically driven pump 4 for the filling of the fuel container 2, and an overflow tube 5, which may return to the supply tank 3, may provide an exact volume, standard for each test. From the bottom of the test fuel container 2 a connection 6 leads to the engine of a car which is to be used in the test, and for this, the normal fuel supply line of the car or other vehicle which is used in the test is disconnected and plugged, and the tube from the test container 2 is connected to the fuel supply inlet of the internal combustion engine of the vehicle.

In the test, the vehicle is positioned with its drive wheels on a trough of rollers 8, suitable approaches 9 or the like being convenient for this purpose. Then, with the drive wheels of the vehicle thus contacting and driving the rollers 8, the motion of the latter is conducted through suitable gearing in the housing 10 and a flexible shaft 11 to an odometer 12 which for precision is preferably calibrated to read in miles and tenths and hundredths at its dial 13. A reset knob 14 allows convenient return to zero after the test. Interposed between the drive and the odometer is a throw-out clutch 15 which normally is held out of engagement by a spring 16, and whose lever 17 is connected to an electromagnet 18 which is energized during the test run and holds the clutch in engagement, thereby permitting the odometer to register. It is desirable also to provide in the housing 10 dynamometer means of any preferred type, desirably one taking up little space, and this may, by connections 20, show the output in horsepower at suitably calibrated dial means on an instrument panel 21.

It is important, for precision, that the cut-off or termination of the test be accurate and prompt; and for this I use the surface of the liquid column in the container 2 at an appropriate point to stop the test, the predetermined amount of liquid fuel from the standard initial level at overflow tube 5 down to the level for the predetermined fuel having been run out to the vehicle engine. The most accurate level operating means involves the meniscus of the top of the liquid column, and as this comes to the predetermined point between the light-sensitive element or photo-electric cell 24 and a source of light 25, the meniscus, acting as a lens, refracts the ray of light from the light source immediately, and through the relay 26 and its electric circuit 27 breaks the current flow to the electromagnet 18, and the spring 16 at once disengages the clutch 15 and the run is terminated.

With such arrangement, the performance of a given sample of liquid fuel can be quickly and precisely tested; and comparisons between samples of liquid fuels can be accurately made with the same vehicle and same conditions. Also, tests of different vehicles may be easily and quickly carried out, with respect to their fuel and other performance.

To carry out a test, the switch B is closed, and the drive wheels of the vehicle being on the rollers 8, as aforementioned, the engine is run for the making of final adjustments and stabilizing of the load, speed, manifold vacuum, and temperatures, the fuel being fed through the outlet valve 29 directly from the general supply tank 3, preliminary to the test. For determining the vacuum, a mercury manometer may be connected to the manifold. Conveniently, the switch B may be a double throw switch. A telltale light 30, which may be on the panel 31, shows that this circuit is active, and its control valve from the general supply tank 3 is open. Switch A is now closed, and this opens the electromagnetically controlled valve 32 which allows the pressure from the pump 4 to fill the container 2 from the general supply tank 3, and the burette or container 2 fills to the overflow 5. A telltale light 33 on the panel shows that this circuit is active for the filling of the test container 2. The run light 30 is still on. When the container 2 is filled to the overflow 5, switch A is opened. The fill light 33 goes out. The run light 30 remains on. With the odometer set at zero, switch B is moved to test position. The telltale test light 35 is now on, and the run and fill lights 30 and 33 are out. The odometer clutch is engaged, and the valve 29 is shut and the valve 32 is open. The engine is being supplied by fuel from the test container 2. When the fuel level therein reaches the level of the ray of light from the source 25 into the pick-up 24, the meniscus at the top of the liquid acts as a lens and refracts the ray of light away, breaking the circuit in the relay 26, and the clutch 15 is immediately disengaged by the action of the return spring 16.

On account of the exact precision of the cut-off at the termination of the run, and the accurate measure of a predetermined test volume of the liquid fuel, a quite small amount is sufficient for accurate results. Thus, with the volume adjusted to 1/20 of a gallon liquid content in the container 2, tests may be run in two minutes' time, yielding results surpassing in accuracy and comparability results otherwise obtained on road runs with great consumption of time and introduction of uncontrolled variables.

Other modes of applying the principle of the invention may be employed, change being made as regards the detail described, provided the features stated in any of the following claims, or the equivalent of such, be employed.

I therefore particularly point out and distinctly claim as my invention:

1. In apparatus for testing fuel performance in road vehicles propelled by internal combustion engines, having means for indicating mileage run by a drive wheel of the vehicle and parallel roller trough means on which the drive wheels of the vehicle may be positioned, together with means for transmitting motion from the roller means to both said indicating means, dynamometer means connected to said roller means, and a clutch controlling transmission to the means for indicating mileage; springs means holding said clutch disconnected, electromagnetic means for connecting said clutch, a graduated fuel container for liquid volume rated in fractions of gallons, a conduit for connecting the container to the engine fuel inlet in place of normal engine fuel supply conduit, a fuel supply tank line for filling said fuel container, a valve on said supply line with electromagnetic opening means, a valve controlling the outlet of said fuel container to the engine having electromagnetic opening means, circuit means for simultaneously opening the latter and connecting said clutch, a photoelectric cell and light providing a light train through the lower part of said fuel container to detect the run-out point level of the predetermined amount of fuel and to release the electromagnetic means controlling the aforesaid clutch, and telltale lights in the circuits controlling the valves and clutch showing when the apparatus is respectively on preliminary run, on fill, and on test run.

2. Apparatus for testing fuel performance co-related to commercial fuel-purchase units in road vehicles propelled by internal combustion engines, which comprises means for indicating mileage run by a drive wheel of the vehicle, means for transmitting motion from such wheel to said indicating means, a clutch controlling transmission to the means for indicating mileage, electromagnetic means for connecting said clutch, a graduated fuel container having transparent wall means holding liquid fuel in volume rated in fractions of gallons, a conduit therefrom for connecting the container to the engine fuel inlet, a valve controlling said conduit and having electromagnetic opening means, and means operated by the sight level of liquid at a predetermined point for controlling said clutch said means including a light source at one side of said container and a light-sensitive means opposite to be affected when the liquid level arrives at such point.

3. Apparatus for testing fuel performance co-related to commercial fuel-purchase units in road vehicles propelled by internal combustion engines, which comprises means for indicating mileage run by a drive wheel of the vehicle, means for transmitting motion from such wheels to said indicating means, a connector for the means indicating mileage, a container having transparent wall means to hold liquid fuel in volume rated in fractions of gallons and supply the same to the vehicle engine, a valve controlling the outlet of said fuel container and having electromagnetic operating means, circuit means for simultaneously operating the valve and said connector, and means operated by the sight level of liquid at a predetermined point for actuating said circuit means to release said connector, including a light source at one side of said container and a light-sensitive means opposite to be affected when the liquid level arrives at such point.

4. Apparatus for testing fuel performance co-related to commercial fuel-purchase units in road vehicles propelled by internal combustion engines, which comprises means for indicating mileage run by a drive wheel of the vehicle, means for transmitting motion from such wheels to said indicating means, a connector for said indicating means, a fuel supply container for the engine having opposite transparent walls and holding liquid fuel in volume measured in fractions of gallons, and means for actuating said connector by the sight level of liquid in the container said means including a light source at one side of said container and a light-sensitive means at the opposite side to be affected when the liquid falls to a predetermined level to electrically operate said connector.

5. Apparatus for testing fuel performance co-related to commercial fuel-purchase units in road vehicles propelled by internal combustion engines, which comprises means for indicating mileage run by the drive wheel of the vehicle, means for transmitting motion from such wheel to said indicating means, a connector therefor, a container having opposite transparent walls and holding liquid fuel in volume rated in fractions of gallons, means for connecting the fuel container to the engine fuel inlet, a valve control therefor, electric circuit means for simultaneously actuating said valve control and said connector of the mileage indicating means, a light source at one side of said container at a predetermined level, and a light sensitive means at the opposite side to be affected when the liquid level in the container falls to the level of the light source and thereby control the circuit operating the connector.

6. Apparatus for testing fuel performance correlated to commercial fuel-purchase units in road vehicles propelled by internal combustion engines, which comprises means for measuring a function of the revolution of the engine on an amount of liquid fuel which is measured, an electrically controlled connector for said means, a container having opposite transparent walls and holding liquid fuel in volume rated in fractions of gallons, a light source at one side of said container, and a light-sensitive means at the opposite side to be affected when the liquid level in the container falls to a point where the light-sensitive means is affected to control the circuit operating the connector.

JOHN J. BAADTE.

REFERENCES CITED

The following references are of record in the file of this patent:

UNITED STATES PATENTS

| Number | Name | Date |
| --- | --- | --- |
| 1,800,640 | Jehle et al. | Apr. 14, 1931 |
| 1,955,315 | Styer | Apr. 17, 1934 |
| 2,306,845 | Sherman et al. | Dec. 29, 1942 |
| 2,359,720 | Weckerly | Oct. 3, 1944 |
| 2,409,982 | Longmate | Oct. 22, 1946 |